US009094882B2

(12) United States Patent
Callender et al.

(10) Patent No.: US 9,094,882 B2
(45) Date of Patent: Jul. 28, 2015

(54) MODIFIED MEASUREMENT PROCEDURES FOR USER EQUIPMENTS

(75) Inventors: Christopher Peter Callender, Kinross (GB); Tao Chen, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 13/358,644

(22) Filed: Jan. 26, 2012

(65) Prior Publication Data

US 2013/0189971 A1    Jul. 25, 2013

(51) Int. Cl.
*H04W 24/00* (2009.01)
*H04W 36/00* (2009.01)
*H04W 84/04* (2009.01)

(52) U.S. Cl.
CPC ........ *H04W 36/0094* (2013.01); *H04W 84/045* (2013.01)

(58) Field of Classification Search
USPC ........ 455/423, 422.1, 450, 444; 370/252, 331
See application file for complete search history.

(56) References Cited

U.S. PATENT DOCUMENTS

| 7,941,155 | B2 * | 5/2011 | Ji et al. ........................... 455/453 |
| 8,165,590 | B2 * | 4/2012 | Gunnarsson et al. ......... 455/446 |
| 8,270,365 | B2 * | 9/2012 | Jeong et al. .................... 370/331 |
| 2004/0023634 | A1 | 2/2004 | Jeong et al. |
| 2005/0221824 | A1 * | 10/2005 | Lee et al. .................... 455/435.2 |
| 2006/0014538 | A1 * | 1/2006 | Yuan .............................. 455/436 |
| 2008/0057934 | A1 * | 3/2008 | Sung et al. .................. 455/422.1 |
| 2008/0268843 | A1 | 10/2008 | Ore et al. |
| 2008/0287127 | A1 | 11/2008 | Wu et al. |
| 2009/0047958 | A1 | 2/2009 | Rimhagen et al. |
| 2009/0104905 | A1 * | 4/2009 | DiGirolamo et al. ......... 455/434 |
| 2009/0117891 | A1 * | 5/2009 | Chou ............................ 455/423 |

(Continued)

FOREIGN PATENT DOCUMENTS

| EP | 1971176 | 9/2008 |
| EP | 2077689 | 7/2009 |

(Continued)

OTHER PUBLICATIONS

3GPP TSG RAN Meeting #54, RP-111749, Berlin, Germany (Dec. 6-9, 2011), Nokia Corporation, "Update to LTE Carrier Aggregation Enhancements WID", (6 pages).

(Continued)

*Primary Examiner* — Kashif Siddiqui
*Assistant Examiner* — Mong-Thuy Tran
(74) *Attorney, Agent, or Firm* — Oblon, McClelland, Maier & Neustadt, L.L.P.

(57) ABSTRACT

A network sends to a user equipment UE downlink signaling indicating at least one frequency which is subject to special handling. In response the UE measures and reports neighbor cells operating on any of that/those frequencies without regard to a threshold signal strength of a serving cell which is configured for reporting neighbor cells. In more specific examples, if the neighbor cells operating on any of that/those frequencies is considered a first set of neighbor cells, then the network also sends a second set of neighbor cells in other downlink signaling. Measuring and reporting on the first set of neighbor cells is less frequent than for the second set of neighbor cells, when measurements of the second set is required. Measuring and reporting on the second set is dependent on measured signal strength of a serving cell being greater than the configured threshold signal strength of the serving cell.

20 Claims, 5 Drawing Sheets

(56) References Cited

U.S. PATENT DOCUMENTS

| | | | |
|---|---|---|---|
| 2009/0124249 A1 | 5/2009 | Young et al. | |
| 2009/0137246 A1* | 5/2009 | Xing et al. | 455/434 |
| 2009/0233607 A1* | 9/2009 | Claussen et al. | 455/437 |
| 2009/0239535 A1 | 9/2009 | Chun et al. | |
| 2009/0270103 A1 | 10/2009 | Pani et al. | |
| 2010/0041412 A1* | 2/2010 | Yu | 455/450 |
| 2010/0278142 A1 | 11/2010 | Dwyer et al. | |
| 2010/0330921 A1 | 12/2010 | Kim et al. | |
| 2010/0330981 A1 | 12/2010 | Kazmi | |
| 2011/0009117 A1* | 1/2011 | Breuer et al. | 455/434 |
| 2011/0053597 A1* | 3/2011 | Lee et al. | 455/436 |
| 2011/0076958 A1 | 3/2011 | Fukushi | |
| 2011/0110254 A1 | 5/2011 | Ji et al. | |
| 2011/0143738 A1 | 6/2011 | Kone | |
| 2011/0212693 A1* | 9/2011 | Sagfors et al. | 455/67.11 |
| 2011/0212725 A1* | 9/2011 | Vikberg et al. | 455/435.2 |
| 2011/0237272 A1* | 9/2011 | Gorokhov et al. | 455/452.1 |
| 2011/0242999 A1* | 10/2011 | Palanki et al. | 370/252 |
| 2011/0250910 A1* | 10/2011 | Lee et al. | 455/466 |
| 2011/0269449 A1* | 11/2011 | Kazmi et al. | 455/422.1 |
| 2011/0275385 A1* | 11/2011 | Escolar-Piedras et al. | 455/456.1 |
| 2011/0281578 A1 | 11/2011 | Narasimha et al. | 455/423 |
| 2011/0281615 A1* | 11/2011 | Yamada et al. | 455/524 |
| 2011/0294499 A1* | 12/2011 | Vikberg et al. | 455/423 |
| 2011/0310753 A1 | 12/2011 | Chou et al. | |
| 2012/0003981 A1* | 1/2012 | Krishnamurthy et al. | 455/450 |
| 2012/0033646 A1* | 2/2012 | Luo et al. | 370/336 |
| 2012/0039189 A1* | 2/2012 | Suzuki et al. | 370/252 |
| 2012/0046030 A1* | 2/2012 | Siomina et al. | 455/423 |
| 2012/0064903 A1* | 3/2012 | Pani et al. | 455/450 |
| 2012/0076018 A1* | 3/2012 | Singh et al. | 370/252 |
| 2012/0088516 A1* | 4/2012 | Ji et al. | 455/452.1 |
| 2012/0113844 A1* | 5/2012 | Krishnamurthy | 370/252 |
| 2012/0122511 A1 | 5/2012 | Antonio et al. | |
| 2012/0231782 A1* | 9/2012 | Hellander et al. | 455/422.1 |
| 2013/0029666 A1* | 1/2013 | Jung et al. | 455/436 |
| 2013/0040640 A1* | 2/2013 | Chen et al. | 455/434 |
| 2013/0084858 A1 | 4/2013 | Ramasamy et al. | |

FOREIGN PATENT DOCUMENTS

| | | |
|---|---|---|
| EP | 2262309 | 12/2010 |
| GB | 2484011 A | 3/2012 |
| WO | 9859448 | 12/1998 |
| WO | 2009097481 | 8/2009 |
| WO | WO-2012047168 A1 | 4/2012 |

OTHER PUBLICATIONS

3GPP TSG RAN Meeting #54, RP-111729, Berlin, Germany (Dec. 6-9, 2011), Nokia Corporation, "Status Report to TSG", (13 pages).

3GPP TSG RAN WG1 Meeting #67, R1-114071, San Francisco, USA (Nov. 14-18, 2011), NTT Docomo, "Issues Regarding Additional Carrier Type in Rel-11 CA", (5 pages).

3GPP TSG-RAN WG2 #76, R2-115745, San Francisco, USA, (Nov. 14-18, 2011), NTT Docomo, Inc., "Inter-Frequency Pico Cell Measurements for Hetnet Deploymentg", (4 pages).

3GPP TS 36.133 V10.5.0 (Dec. 2011), Technical Specification, $3^{rd}$ Generation Partnership Project; Technical Specification Group Radio Access Network; Evolved Universal Terrestrial Radio Access (E-UTRA); Requirements for Support of Radio Resource Management (Release 10), (375 pages).

EP Search Report for corresponding GB Patent Application No. 1201125.0 issued Jun. 11, 2012.

LG Electronics Inc: Measurement restriction for macro-pico scenario, 3GPP Draft; R2-106579 Measurement Restriction for Macro-Pico Scenario; vol. RAN WG2, no. Jacksonville, USA; 20101115, Nov. 9, 3020 (Nov. 9, 2010), XP050492353; paragraph 2, figure 1.

Renesas Mobile Europe Ltd: Discussion on Rela 11 eICIC Scenarios, 3GPP Draft; R2-114052 REL'11EICIC Scenarios; vol. RAN WG2, no. Athens, Greece; 20110822, Aug. 16, 2011, XP050539942, paragraph 3, figure 1.

CMCC: 'Measurement resource restriction for inter-frequency measurement in R11 eICIC', 3GPP Draft; R2-115252 Measurement Resource Restriction for Inter-Frequency Measurement in R11 EICIC, vo 1 . RAN WG2, no. Zhuhai ; 20111010, Oct. 4, 2011, XP050541012, paragraph 2.1, figure 1a).

3GPP TSG-RAN WG2 Meeting #74, Barcelona, Renesas Mobile Europe Ltd., TeliaSonera Ericsson, ST-Ericsson: "Reselection from UTRAN Cell Fach state to EUTRA" 3RD Generation Partnership Project (3GPP), Mobile Competence Centre; 650, Route Des Lucioles, vol. R2-113383, May 12, 2011 pp. 1-4, XP002691654, Barcelona, Spain, Retrieved from the internet: URL:http://www.3gpp.orgjftpjtsg_ranjWG_RL2/TSGR2_74/Docs; Measurements and reselection to high priority layers; p. 3, paragraph 2.2- p. 4.

3GPP TSG-RAN WG2 Meeting #60bis; Nokia Corporation et al: "Discussion on various Idle Mode open items", 3GPP Draft; RZ-080175 E-UTRA Reselection CONSIDERATIONS_V3, 3RD Generation Partnership Project (3GPP), vol. RAN WG2, no. Sevilla, Spain; 20080108, Jan. 8, 2008, XP0 50138054, Measurement rules p. 1, paragraph 2.1; Priority handling p. 2, paragraph 2.3; Measurement Rules p. 3, paragraph 2.4 .

3rd Generation Partnership Project; Technical Specification Group Radio Access Network; Evolved Universal Terrestrial Radio Access (E-UTRA); User Equipment (UE) procedures in idle mode (Release 10), 3GPP Standard;3GPP TS 36.304, 3RD Generation Partnership Project (3gpp), vol. RAN WG2, No. V10.2.0, Jun. 21, 2011, pp. 1-33, XP050553465, Reselection priorities handling p. 18, paragraph 5.2. 4.1; Measurement Rules p. 3, paragraph 5.2.4.2- p. 19.

3GPP TSG-RAN WG4 Meeting #46bis, Nokia Scheduling of LTE Measurement Gaps for Inter-Frequency and Inter-RAT Monitoring, R4-081074 (May 4-9, 2008) (5 pages).

3GPP TSG-RAN WG2 Meeting #75, Renesas, Addition of Measurements and Reselection from UTRAN CELL_FACH to E-UTRAN, R2114351, (Aug. 22-26, 2011), (11 pages).

3GPP TSG-RAN Meeting #52, Renesas, "WID Update to Further Enhancements to CELL_FACH", RP-110913, (May 31,-Jun. 3, 2011) 5 pages.

* cited by examiner

```
MeasObjectEUTRA ::=         SEQUENCE {
    carrierFreq                 ARFCN-ValueEUTRA,
    allowedMeasBandwidth        AllowedMeasBandwidth,
    presenceAntennaPort1        PresenceAntennaPort1,
    neighCellConfig             NeighCellConfig,
    offsetFreq                  Q-OffsetRange           DEFAULT dB0,
    --Cell list
    cellsToRemoveList           CellIndexList                           OPTIONAL,   --Need ON
    cellsToAddModList           CellsToAddModList                       OPTIONAL,   --Need ON
    --Black list
    blackCellsToRemoveList      CellIndexList                           OPTIONAL,   --Need ON
    blackCellsToAddModList      BlackCellsToAddModList                  OPTIONAL,   --Need ON
    cellForWhichToReportCGI     PhysCellId                              OPTIONAL,   --Need ON
    ...,
    [[ measCycleSCell-r10           MeasCycleSCell-r10                  OPTIONAL,   --Need ON
       measSubframePatternConfigNeigh-r10  MeasSubframePatternConfigNeigh-r10  OPTIONAL,   --Need ON
    ]]
    freqUsedForCapacity         freqUsedForCapacity if present          OPTIONAL,   --Indicates
    different UE handling of the frequency layer if present
}
```

200, MEASUREMENT OBJECT INFORMATION ELEMENT

202, HOTSPOT FREQUENCY FLAG

204, INDICATION OF WHETHER THIS FREQUENCY IS A HOTSPOT

FIG.2

MODIFIED MEASUREMENT PROCEDURES FOR USER EQUIPMENTS

CROSS REFERENCE TO RELATED APPLICATION

The subject matter detailed herein is related to co-owned U.S. patent application Ser. No. 13/023,675 filed on Feb. 9, 2011 and entitled PRIORITY MEASUREMENT RULES FOR CHANNEL MEASUREMENT OCCASIONS; and also to co-owned U.S. patent application Ser. No. 13/251,363 filed on Oct. 3, 2011 and entitled PRIORITIZING RADIO ACCESS TECHNOLOGIES FOR MEASUREMENT.

TECHNICAL FIELD

The exemplary and non-limiting embodiments of this invention relate generally to wireless communication systems, methods, devices and computer programs, and more specifically relate to user equipment UE measurements of neighbour cells.

BACKGROUND

Abbreviations used in this description and/or in the referenced drawings are defined below following the Detailed Description section.

Inter-frequency mobility procedures for LTE have been designed primarily so that UE remains in coverage. With the deployment of heterogeneous network (hetnet) network elements such as pico-cells, slightly different procedures for inter-frequency measurements could be considered which would better meet the needs of handover to capacity hotspots.

FIG. 1 illustrates a hetnet showing one possible hotspot scenario, specifically scenario 4 for carrier aggregation detailed at 3GPP TS 36.300v11.0.0 informative annex J.1. The eNB 101 provides macro coverage on frequency f1 110 and a number of remote radio heads 102a, 102b are deployed on frequency f2 120 in areas of high traffic such as railway stations, airports, shopping malls, etc. Alternatively, dedicated pico eNBs may be deployed in place of the remote radio heads to provide the hotspot coverage.

With this scenario in mind, now consider the conventional neighbour cell measurement procedures in LTE. The network provides to the UE in the MeasConfig information element a parameter s-Measure which is a threshold for the PCell (macro cell in FIG. 1) that controls whether or not the UE is required to perform neighbour cell measurements. If the serving cell reference signal received power RSRP measured by the UE is greater than the s-Measure parameter, the UE does not measure other cells. There is only one value for s-Measure at any given time for a UE, meaning that same value controls intra-frequency, inter-frequency and inter-RAT measurements. The network can disable this by setting the value "0" for the s-Measure parameter.

The assumption behind this conventional use of the s-Measure parameter is that if the serving cell is good enough, no neighbour cells need to be measured. This makes sense for a coverage-based handover. But the hetnet scenario of FIG. 1 contemplates also capacity-based handovers to a hotspot which may be located within an area of strong macro coverage. In a capacity-based handover, the macro cell 101 is not handing over to assure continuous coverage for the UE as is typical if the RSRP is trending lower, but in order to offload the UE's traffic from the macro cell's f1 frequency layer 110 to the pico cell's f2 frequency layer 120 due to congestion on the macro cell's f1 frequency layer 110. Such a capacity-based handover may be to a hotspot which is located within an area of strong macro cell coverage, and the conventional s-Measure parameter is not very effective for this purpose. The only way in current specifications to ensure that the UE searches for pico cell hotspots 120 that may continuously lie in good macro cell coverage 110 would be to disable s-Measure. One exemplary disadvantage of this technique is that disabling the s-Measure parameter precludes its use for intra-frequency and inter-RAT measurements as well as for any coverage based inter-frequency measurements.

Inter-frequency measurements, either with or without measurement gaps, are assumed to be shared equally between all configured inter-frequency/inter-RAT component carriers, and the current measurement performance requirements are strict since the intention is to avoid dropping a call if the UE reaches the edge of coverage on its current serving frequency/frequencies.

Co-owned U.S. patent application Ser. No. 13/023,675 concerns measuring inter-frequency and inter-RAT neighbour cells and describes that the UE's measurement occasions are used for different neighbour cells depending on whether the UE has good or marginal coverage with its serving cell. It describes a priority re-selection algorithm in the E-UTRAN system by which the network can prioritize measurements of either a frequency layer or a RAT over another, so as to more efficiently use the available measurement occasions depending on the strength of the serving cell.

Co-owned U.S. patent application Ser. No. 13/251,363 detail selecting different sets of entries from the prioritized neighbour cell list depending on whether the UE is searching for purposes of maintaining coverage or for obtaining enhanced services, and the coverage/services distinction is determined at least in part based on the UE's received signal strength or signal quality of its serving cell.

What is needed in the art is a way to distinguish when the UE should do coverage-based neighbour cell measurements and when it should do capacity-based neighbour cell measurements.

SUMMARY

In a first exemplary embodiment of the invention there is a method comprising: receiving downlink signaling indicating at least one frequency which is subject to special handling; and in response, measuring and reporting neighbour cells operating on any of the at least one frequency without regard to a threshold signal strength of a serving cell which is configured for reporting neighbour cells.

In a second exemplary embodiment of the invention there is an apparatus comprising at least one processor and at least one memory storing a set of computer instructions. In this embodiment the at least one processor is arranged with the memory storing the instructions to cause the apparatus to perform: receiving downlink signaling indicating at least one frequency which is subject to special handling; and in response, measuring and reporting neighbour cells operating on any of the at least one frequency without regard to a threshold signal strength of a serving cell which is configured for reporting neighbour cells.

In a third exemplary embodiment of the invention there is a computer readable memory tangibly storing a set of instructions which, when executed on a communicating apparatus causes the apparatus to perform at least: receiving downlink signaling indicating at least one frequency which is subject to special handling; and in response, measuring and reporting neighbour cells operating on any of the at least one frequency without regard to a threshold signal strength of a serving cell which is configured for reporting neighbour cells.

In a fourth exemplary embodiment of the invention there is an apparatus for communicating, comprising means for receiving downlink signaling indicating at least one frequency which is subject to special handling; and means for measuring and reporting neighbour cells operating on any of the at least one frequency without regard to a threshold signal strength of a serving cell which is configured for reporting neighbour cells. For example, the means for receiving may be a radio receiver or an input node of one or more components of a user equipment which receives the downlink signaling from another component of the user equipment; and the means for measuring and reporting may be a processor executing a program stored in a memory that causes a receiver of the user equipment to measure signaling from the neighbour cells.

In a fifth exemplary embodiment of the invention there is a method comprising: arranging neighbour cells into a first list for offloading traffic and a second list for maintaining coverage; and providing downlink signaling to indicate special handling for measuring and reporting neighbour cells in the first list, and a threshold signal strength upon which measuring and reporting neighbour cells in the second list is conditional.

In a sixth exemplary embodiment of the invention there is an apparatus comprising at least one processor and at least one memory storing a set of computer instructions. In this embodiment the at least one processor is arranged with the memory storing the instructions to cause the apparatus to perform: arranging neighbour cells into a first list for offloading traffic and a second list for maintaining coverage; and providing downlink signaling to indicate special handling for measuring and reporting neighbour cells in the first list, and a threshold signal strength upon which measuring and reporting neighbour cells in the second list is conditional.

In a seventh exemplary embodiment of the invention there is a computer readable memory tangibly storing a set of instructions which, when executed on a communicating apparatus causes the apparatus to perform at least: arranging neighbour cells into a first list for offloading traffic and a second list for maintaining coverage; and providing downlink signaling to indicate special handling for measuring and reporting neighbour cells in the first list, and a threshold signal strength upon which measuring and reporting neighbour cells in the second list is conditional.

In an eighth exemplary embodiment of the invention there is an apparatus for communicating, comprising means for arranging neighbour cells into a first list for offloading traffic and a second list for maintaining coverage; and means for providing downlink signaling to indicate special handling for measuring and reporting neighbour cells in the first list, and a threshold signal strength upon which measuring and reporting neighbour cells in the second list is conditional. For example, the means for arranging may be a processor executing a program stored on a memory to store two separate lists of neighbour cells (frequencies), which may be received from a higher network node or which may be parsed by an access node itself. The means for providing downlink signaling may be a transmitter or it may be the processor and the program stored on the memory for directing a transmitter to send the special handling indication and the threshold signal strength.

BRIEF DESCRIPTION OF THE DRAWINGS

FIG. 2 illustrates one non-limiting example of a Measurement Object Information Element adapted according to these teachings to include a flag indicating whether the frequency referred to by this measurement object is used for capacity-based neighbour cell measurement reporting.

DETAILED DESCRIPTION

While the examples below are in the context of the LTE system with a UE operating in a carrier aggregation deployment of a hetnet, these are non-limiting examples only. The specific examples used in these teachings are readily extendable for other RATs (radio access technologies) such as UTRAN (universal terrestrial radio access network) and UMTS (universal mobile telecommunications system), whether or not those other RATs are deployed with carrier aggregation.

The background section above discusses different reasons for handovers; namely coverage-based handovers which are conventional to assure the UE stays within coverage in order to avoid dropped calls, and the more recently relevant capacity-based handovers in which the network seeks to offload some traffic to another cell/frequency layer in order to relive network congestion. Recall the FIG. 1 scenario and the network's need for sufficient information to decide whether to make a capacity-based handover of a UE. From the UE's perspective, to reduce power consumption any measurements of neighbour cells for capacity-based handover purposes should be less frequency. Dispensing with the conventional protocol of sharing the UE's measurement opportunities equally among the different neighbour cells helps ensure that the impact of making capacity-based measurements will minimize any adverse effects on the UE's measurements of carriers needed for coverage purposes, since the capacity-based measurements may not need to be as frequent as the coverage-based measurements in typical deployments.

According to an embodiment of these teachings the eNB indicates to the UE which frequencies are used for hotspots. For those indicated hotspot frequencies the UE will ignore the s-Measure parameter even if it is enabled. This means that for this particular embodiment the UE searches and measures those hotspot frequencies which the macro network may use for additional capacity even when the UE's signal reception from the serving (macro) cell is strong.

For those indicated hotspot frequencies, there are in one embodiment of these teachings more relaxed measurement performance requirements. This means the indicated hotspot (capacity) frequencies can be searched more infrequently than the coverage-based frequencies or the inter-RAT neighbour cells.

According to one non-limiting embodiment, the indication of which frequencies are hotspot frequencies is a flag added to a measurement object information element. Such a flag indicates that the frequency referred to by this measurement object is to be measured by the UE for capacity based handover purposes. In the LTE system, the Measurement Configuration information element (which includes the parameter s-Measure as noted in the background section above) gives the UE specifics for how to conduct its measurements and reporting while the objects/neighbour cells to be measured are identified in all the configured Measurement Object information elements.

Figure 1:
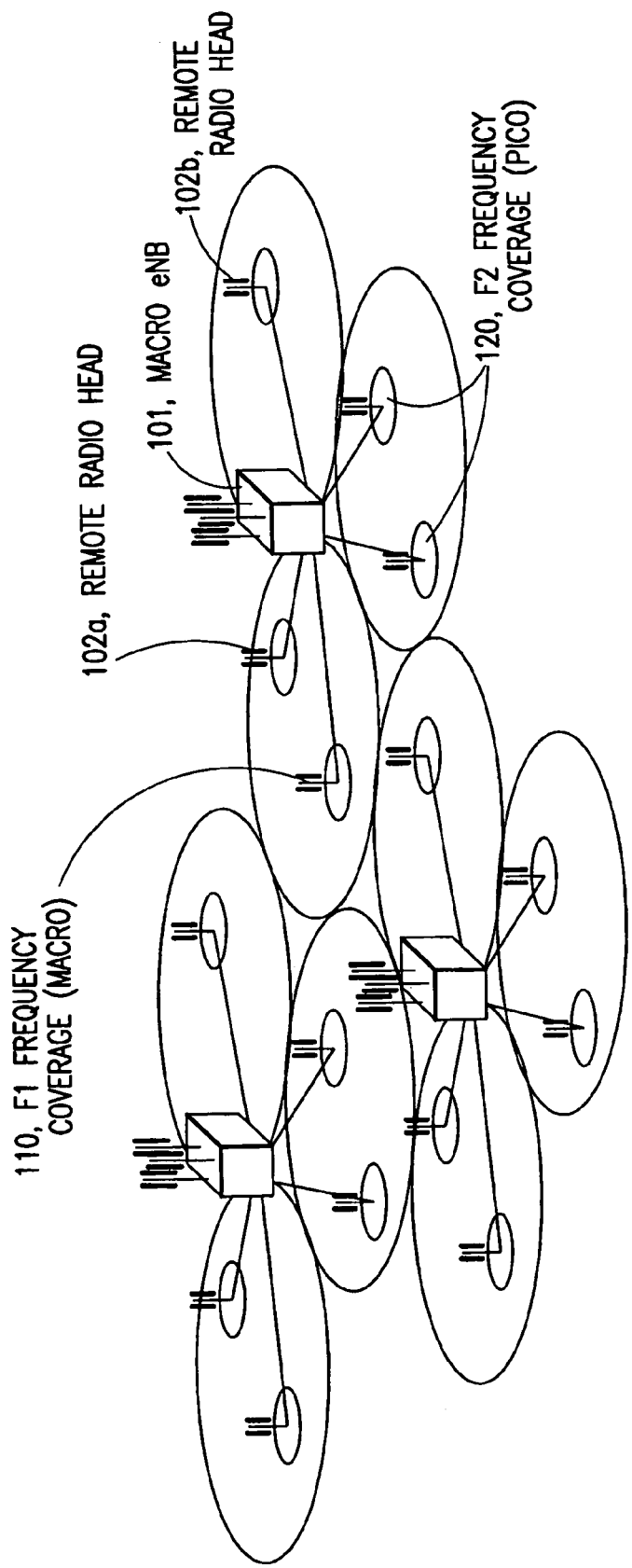
FIG. 1 is a prior art schematic diagram illustrating scenario 4 for carrier aggregation from 3GPP TS 36.300 v11.0.0 showing pico cells within larger macro cells, and illustrates an example environment in which some embodiments of these teachings may be practiced to advantage.

One example implementation of such a flag is shown at FIG. 2, which is a conventional E-UTRAN Measurement Object information element 200 with an added flag 202 indicating whether this frequency is a hotspot 204 (the frequency referred to by the measurement object is a capacity frequency if the flag 202 is set) in use in the area by pico cells or remote radio heads (assuming the environment of FIG. 1). The name of this flag 202 in the FIG. 2 example is "freqUsedForCapacity", but other embodiments may use different terminology for similar functionality in the Measurement Object information element 200. Other implementations may not indicate whether signaled frequencies are hotspots 204 in that Measurement Object 200 itself but instead signal the same substantive information to the UE in different downlink signaling, such as in the Master Information Block MIB on the broadcast channel, or in System Information in the PDCCH as non-limiting alternatives.

The indication 202, 204 of the hotspot frequencies can be used to enable the UE to perform more infrequent measurements (reduced measurement occasions/requirements) when those measurements are for capacity purpose, rather than the more urgent coverage-based case. But such frequency indications 202, 204 can also be used for a variety of other purposes, instead of or in addition to distinguishing cells that are most appropriate for capacity-based handovers from cells that are most appropriate for coverage-based handovers. Therefore a more generic term for this indication 202, 204 for all the measurement objects is an indication of what frequencies are subject to special handling as compared with conventional mobility procedures which are more optimised for coverage-type handovers. For the capacity-based handover scenarios the special handling is for the UE to ignore the s-Measure parameter and to measure on a more infrequent basis than other neighbour cell frequencies which are reported in dependence on the s-Measure parameter.

For inbound mobility from the macro cell 101 to the overlaid small/pico cell 102a, the inter-frequency searching for the pre-defined hotspots is activated with a low searching rate. The capacity-driven handover may need to take into account the load of the target cell to improve the performance or balance the load between cells. In this respect according to an exemplary embodiment of these teachings there is also a capacity indicator which the different cells indicate to one another, such as across the X2 interface 23 shown at FIG. 4. In one embodiment the pico cell 102a informs the macro cell 101 of the pico cell's capacity to handle additional traffic, and the macro cell 101 similarly informs the pico cell 102a of the macro cell's capacity to handle additional traffic.

The above capacity indication communicated directly between the pico cell 102a and the macro cell 101 would result in the UE still taking and reporting measurements on the pico cell 102a even when the macro cell 101 has sufficient capacity and/or when the pico cell 102a has little or none. To address this issue, in another embodiment the pico cell 102a broadcasts a capacity indication, or the macro cell 101 broadcasts a capacity indication on behalf of the pico cell 102a, which allows the UE to measure and report this particular pico cell 102a whose frequency is in the list 204 only if the pico cell's broadcast capacity indicator indicates the pico cell 102a is not at or near full capacity. In this regard the pico cell's capacity indicator (which may be broadcast by the macro or the pico cell) may be a simple overload indicator; as little as a single bit indicating overload or not. The overload indication can alternatively be more than one bit and carry more than only binary overload/no-overload information, such as some gradations of relative capacity remaining in the pico cell 102a.

In one embodiment the macro cell 101 can also be informed of capacity/overload indicator and semi-statically remove from the list 204 that particular pico cell's frequency. In one embodiment the macro cell 101 removes such a frequency under two conditions: that particular pico cell's indicator indicates overload, and no other hotspots/cells in the area are using the same frequency.

To configure the neighbour cell list the network operator will consider whether a frequency in the neighbour list is used for coverage purposes or for capacity purposes. The macro eNBs of the system are then configured (for example, by the network operator's operations and maintenance systems) with the appropriate setting of the flag 202 for each frequency in the eNB neighbour list. Those frequencies with the flag set (capacity purpose cells) are indicated for special handling 204, and together all the frequencies having the flag set form a list which may be considered to represent a first set of neighbour cells, and all those frequencies without the flag set (for example, neighbour macro eNBs) are put in the conventional neighbour cell list which may be considered a second neighbour cell list which the UEs measure and report with regard to the s-Measure parameter. For those instances where the flag 202 is not set for any measurement object, the eNB 101 has found no neighbour cells which are classified as being for capacity handover purposes. The first set of neighbour cells is empty and the UE's behaviour as far as measuring and reporting neighbour cells is no different from conventional practice; it will only measure and report on the second set of neighbour cells and according to the conventional measurement gap practice. For those frequencies for which the flag 202 is set the UE will ignore the s-Measure parameter as to those frequencies indicated for special handling 204 and measure and report those cells (in the first neighbour cell list) on a more infrequent basis than those on the conventional neighbour cell list (the second neighbour cell list).

In one embodiment for mobility inbound from the macro cell 101 to the overlaid small/pico cell 102a, this hotspot frequency can be defined for the UE which is under the macro cell as its serving cell. This list for capacity enhancement is in some embodiments orthogonal to the conventional inter-frequency neighbour cell list which is used for coverage-based handovers. According to the above examples these two lists are defined separately, with different searching rates and trigger configurations. In an embodiment the network can override the initial low searching rate for the special handling frequencies and signal the UE to change the measurement and reporting rate, but the default condition (absent specific signaling) is for a searching/reporting rate for the special handling cells to be lower than that for the cells in the conventional neighbour cell list.

In one embodiment for mobility outbound from the small/pico cell 102a to the overlaid large/macro cell 101, this is a coverage-based handover and so the hotpot frequency list 204 may not be necessary in this embodiment, and typically may not be activated unless possibly there is a still smaller cell within the area of the pico cell 102a for capacity enhancement as a further part of a hierarchical cell structure. For this typical outbound mobility case there would be no capacity-driven cell searching list, or if there is the typical case would be that the special handling searching/reporting by UEs under control of a pico/femto cell is deactivated.

One advantage of the less frequent measurements of those special handling cells is that it reduces the dependency on measurement gaps for performing measurements. There are a limited number of measurement gaps during which the UE can re-tune its receiver to a frequency other than its serving cell's in order to measure a neighbour cell. Fewer instances of measuring the special handling cells means more of those gaps are available for measuring those neighbour cells which are available for coverage-based handovers, which would continue to be measured and reported as is conventional with reference to the serving cell's RSRP/RSRQ.

The FIG. 1 environment assumes a carrier aggregation system, in which the hotspot frequency/pico cell is configured as a secondary component carrier. For UEs capable of operating on multiple component carriers at once, in case the network has not configured a secondary component carrier for the UE it can use its additional RF capability for taking measurements of the special handling cells even without using measurement gaps allowed by its serving cell 101 (these example assume the serving cell is a macro cell 101 but this is a non-limiting feature).

For UEs not capable of carrier aggregation operation, measurements of the special handling cells may be done with an additional "measurement" RF (radio-frequency) receive chain. The advantage enabled by the above non-limiting examples is that measuring the special handling cells would not occupy any measurement gaps, and aspects of the performance of this additional RF chain such as receiver sensitivity may need not be as good as the main reception RF chain in order to reduce its additional cost. For example, there is no need to detect capacity cells at the lowest signal levels. LTE Release 8 specifications even allow for UEs which have such an additional RF chain and do not need gaps for measurements. For UEs without any additional RF receive chain, the macro eNB 101 may provide infrequent gaps in a separate gap pattern, different from the conventional measurement gaps which allow for coverage-based measurements and reporting, which allows the UE to search and measure the capacity frequency layer(s) indicated for special handling 204. Or such a UE can instead autonomously decide when to measure the special handling cells regardless of the measurement gap pattern the network configures for it. For example, this UE might notice a brief interruption to the serving cell's 101 transmissions and the serving cell 101 might notice a brief interruption to the UEs transmission during which time the UE can measure the special handling cells.

The conventional measurement gaps configured by the eNB for neighbour cell measurements may be used for measuring the special handling cells, but with a lesser share of those measurement gaps being used for the special handling cells which represent the capacity-based frequency layers, and a larger share being used for the conventional neighbour cell list which represents the coverage-based frequency layers.

To more smoothly handle integration with legacy UEs such as those capable only of LTE Release 8 operation, some embodiments of these teachings also employ a new s-Measure parameter. In this specific case, the network can set the old s-Measure parameter to zero so that the legacy/Release 8 UEs will measure and report on all the cells in their conventional neighbour cell list for any measured signal strength of their serving cell (since the threshold s-Measure against which they compare the serving cell measured signal strength is zero). Then the newer UEs would ignore the old Release 8 s-Measure parameter and use only the new one, for example s-Measure1, whenever it is provided. The use would be as detailed above for the conventional neighbour cell list and to ignore the s-Measure1 value for each frequency indicated for special handling 204.

One technical advantage of these teachings is that they enable coverage and capacity measurements to be optimized according to their different needs. The coverage performance is less impacted by the measurement of capacity frequencies since the latter measurements can be performed less frequently. The parameter s-Measure (or the new parameter s-Measure1) can be configured to inhibit measurements of coverage frequencies/RATs without inhibiting measurements of capacity frequencies. This may improve the UE's power consumption on two counts; because the parameter s-Measure (or s-Measure1) is able to be configured to limit measurement activities on coverage carriers/cells that don't need to be measured when the serving cell is strong, and/or because there is reduced measurement activity on the capacity carriers as compared to simply measuring them just as often as measuring the capacity cells.

Figure 3A:
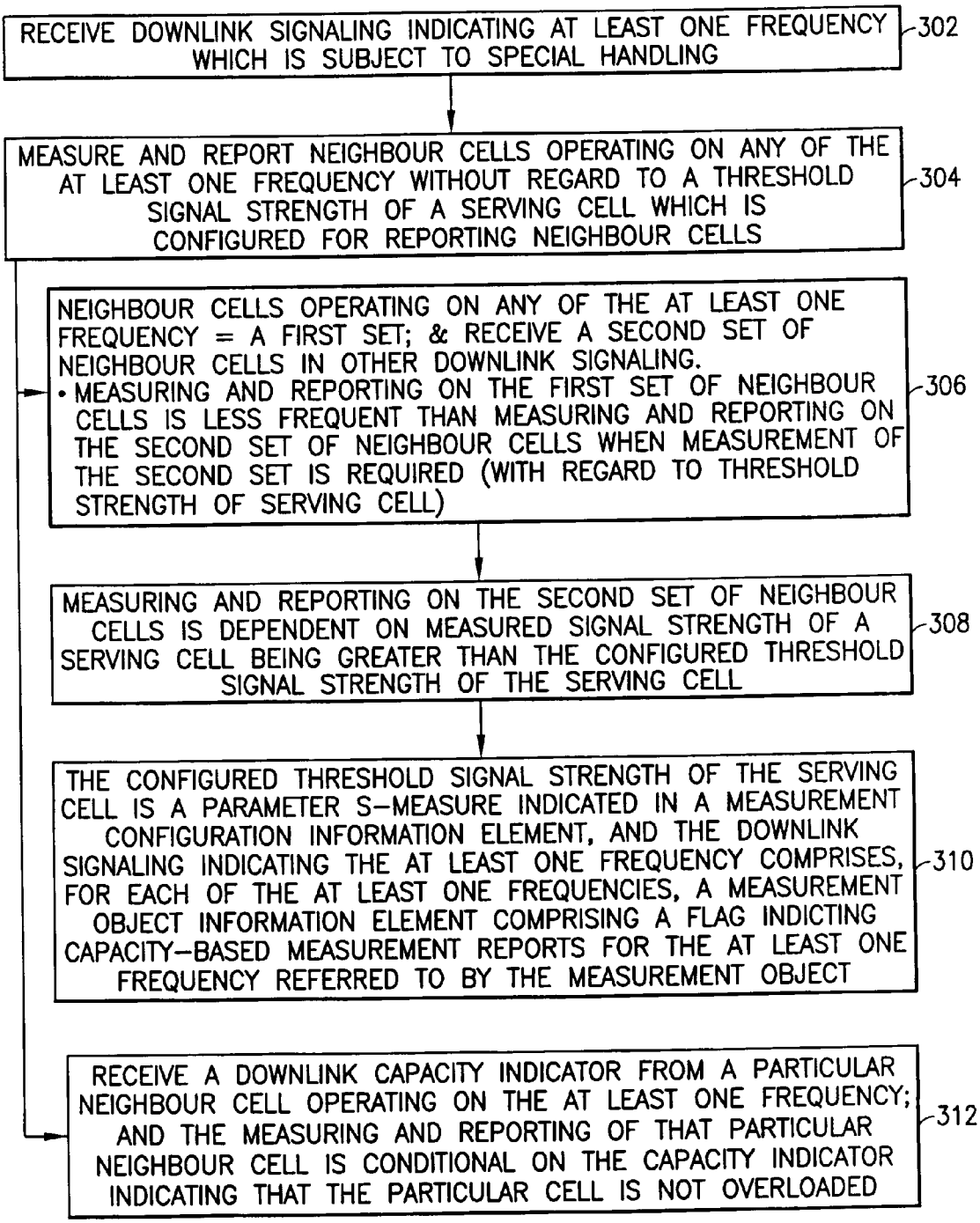
FIG. 3A-B are logic flow diagrams that illustrates, from the perspective of the UE and the network access node, the operation of a method, and a result of execution of computer program instructions embodied on a computer readable memory, in accordance with the exemplary embodiments of this invention.
Figure 3B:
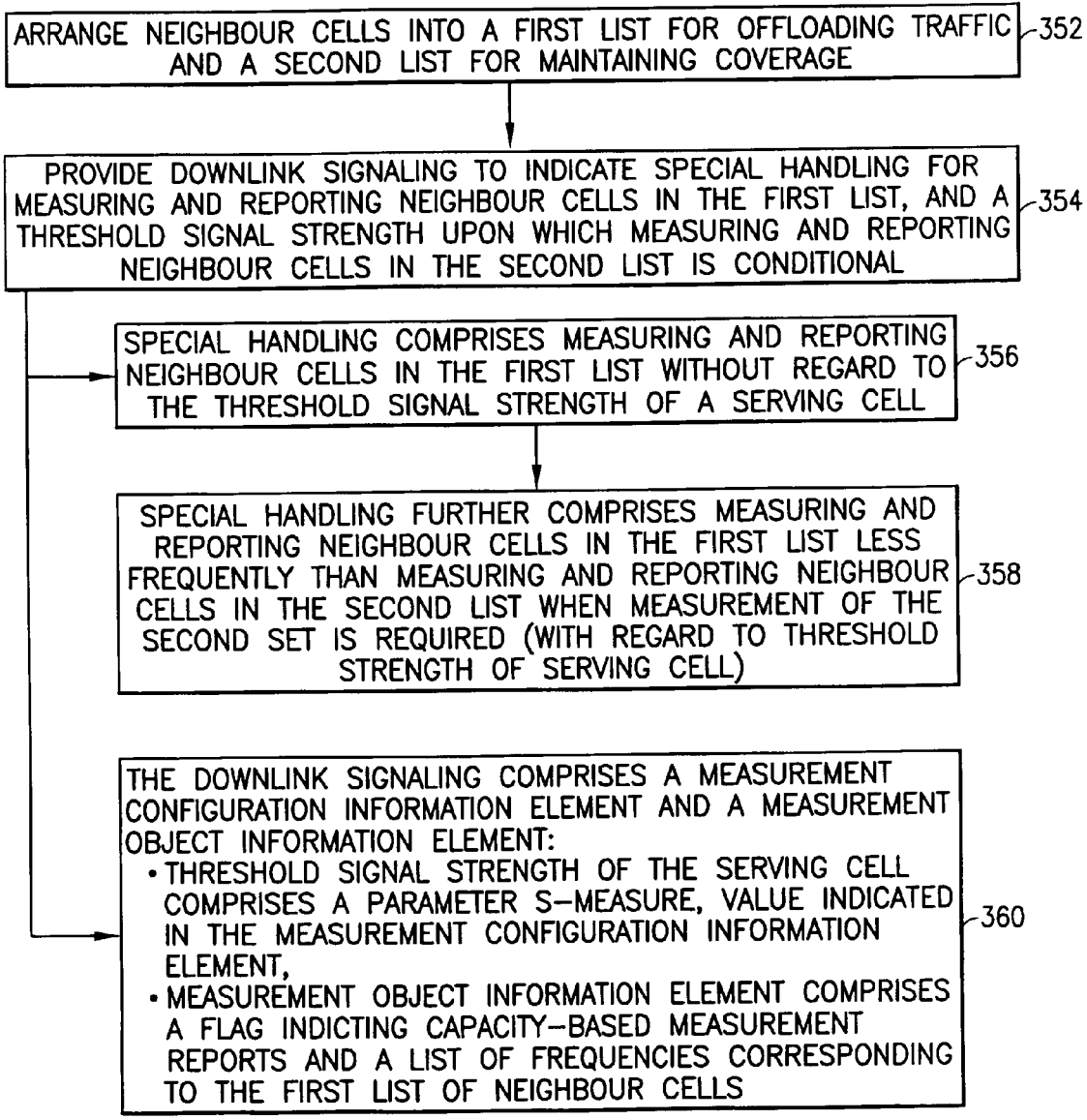

FIGS. 3A-B are logic flow diagrams which summarize some example embodiments of the invention. FIG. 3A describes from the perspective of the UE and FIG. 3B describes from the perspective of the macro eNB, and each of those Figures may be considered to illustrate the operation of a method, and a result of execution of a computer program stored in a computer readable memory, and a specific manner in which components of an electronic device are configured to cause that electronic device to operate, whether such an electronic device is the UE, the eNB or other network access node, or one or more components thereof such as a modem, chipset, or the like.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a mobile phone/UE, to perform the various functions summarized at FIG. 3) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a mobile phone/UE or a similar integrated circuit in a server, a cellular network device, or other network device.

Now consider FIG. 3A from the perspective of the UE. At block 302 the UE receives downlink signaling indicating at least one frequency which is subject to special handling, and in response at block 304 the UE measures and reports neighbour cells operating on any of the at least one frequency without regard to a threshold signal strength of a serving cell which is configured for reporting neighbour cells. Where the functions described by FIG. 3A are practiced by one or more components for a UE, such components may be configured to receive the downlink signaling as an input from a receiver of the UE or some other element of the UE's receive RF chain and also configured to control the measuring and the reporting as said in block 304.

The remainder of FIG. 3A illustrates more specific implementations. Block 306 characterizes the neighbour cells operating on any of the at least one frequency as a first set of neighbour cells, and the UE receives a second set of neighbour cells in other downlink signaling. In this case the UE's measuring and reporting on the first set of neighbour cells may be less frequent than the UE's measuring and reporting on the second set of neighbour cells, when measurements of the second list is required by s-Measure/s-Measure1 (e.g., s-Measure/s-Measure1 is not disabled). Block 308 gives further detail that the measuring and reporting on the second set of neighbour cells is dependent on measured signal strength of a serving cell being greater than the configured threshold signal strength of the serving cell.

Block 310 details the specific example above in which the configured threshold signal strength of the serving cell is a parameter s-Measure indicated in a Measurement Configuration information element, and the downlink signaling indicating the at least one frequency comprises, for each of the at least one frequencies, a Measurement Object information element comprising a flag indicating capacity-based measurement reports and the at least one frequency associated with the flag.

And finally at block 312 the UE additionally receives a downlink capacity indicator from a particular neighbour cell (one of the neighbour cells noted in block 304) operating on the at least one frequency; and in this case the UE's measuring and reporting of that particular neighbour cell is conditional on the capacity indicator indicating that the particular cell is not overloaded.

FIG. 3B summarizes some embodiments from the perspective of a network access node such as the eNB of the macro cell 101. At block 352 the eNB arranges neighbour cells into a first list for offloading traffic and a second list for maintaining coverage; and at block 354 the eNB provides downlink signaling to indicate special handling for measuring and reporting neighbour cells in the first list, and a threshold signal strength upon which measuring and reporting neighbour cells in the second list is conditional. Where the functions described at FIG. 3B are practiced by one or more components for an eNB, such components may be configured to store in a local memory of the eNB the first and second list if such lists are actually compiled by some other network element or other component of the eNB, and practicing component(s) execute block 354 by outputting the downlink signaling to a transmitter or other element of a transmit RF chain of the eNB.

The remainder of FIG. 3B illustrates more specific implementations. Block 356 provides that the special handling comprises measuring and reporting neighbour cells in the first list without regard to the threshold signal strength, in which the threshold signal strength is of a serving cell, and block 358 provides that the special handling further comprises measuring and reporting neighbour cells in the first list less frequently than measuring and reporting neighbour cells in the second list, when measurements of the second list is required (by s-Measure/s-Measure1 in the above non-limiting examples).

Block 360 more closely reflects some of the specific examples above, in which the downlink signaling comprises a Measurement Configuration information element and a Measurement Object information element. In this case the threshold signal strength of the serving cell comprises a parameter s-Measure whose value is indicated in the Measurement Configuration information element, and the Measurement Object information element comprises a flag indicating capacity-based measurement reports and a list of frequencies corresponding to the first list of neighbour cells.

Figure 4:
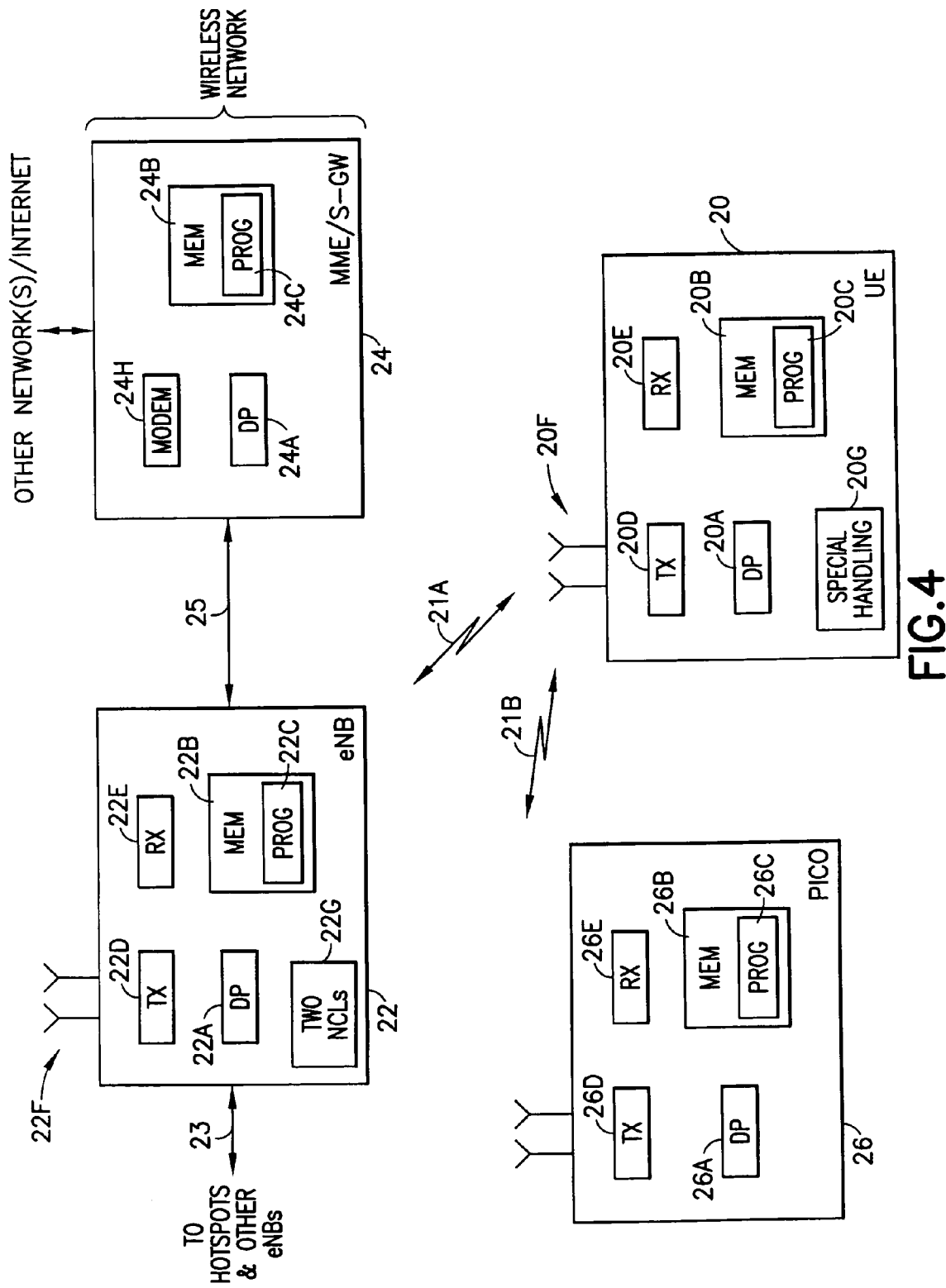
FIG. 4 is a non-limiting example of a simplified block diagram of the UE in communication with a wireless network illustrated as an eNB and a MME/S-GW, which are exemplary electronic devices suitable for use in practicing the exemplary embodiments of this invention.

Reference is now made to FIG. 4 for illustrating a simplified block diagram of various electronic devices and apparatus that are suitable for use in practicing the exemplary embodiments of this invention. In FIG. 4 a wireless network (eNB 22 and mobility management entity MME and/or serving gateway S-GW 24) is adapted for communication over a wireless link 21A with an apparatus, such as a mobile terminal or UE 20, via a network access node such as a base station/eNB 22 or relay station. The network may include the MME/S-GW 24 which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the network access node 22 via one or more antennas 20F. Also stored in the MEM 20B at reference number 20G is the UE's rules for special handling of the capacity frequency layer as distinguished from the coverage frequency layers as is detailed above with specificity.

The network access node 22 is in the position of the macro cell 101 in FIG. 1, and also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The access node 22 also includes at unit 22G the two distinct neighbour cell lists (NCLs) which it indicates different handling to the UE via the s-Measure (or s-Measure1) parameter and the special handling indication/flag. There is also a data and/or control path 25 coupling the eNB 22 with the MME/S-GW 24, and another data and/or control path 23 coupling the eNB 22 to other base stations/eNBs/access nodes such as the pico access node 26 which is in the position of one of the pico cells 102a shown at FIG. 1. The UE 20 has a wireless link 21B with the pico eNB 26 for taking measurements thereof, and so that in a particular embodiment it can also receive the overload indicator which in the example above is broadcast by the pico eNB 26.

For completeness the pico eNB 26 is also illustrated as having a data processor (DP) 26A, storing means/computer-readable memory (MEM) 26B storing at least one computer program (PROG) 26C, and communicating means such as a transmitter TX 26D and a receiver RX 26E for bidirectional wireless communications with the UE 20 via one or more antennas.

Similarly, the MME/S-GW 24 includes processing means such as at least one data processor (DP) 24A, storing means such as at least one computer-readable memory (MEM) 24B storing at least one computer program (PROG) 24C, and communicating means such as a modem 24H for bidirectional wireless communications with the eNB 22 via the data/control path 25. While not particularly illustrated for the UE 20 or base station 22, those devices are also assumed to include as part of their wireless communicating means a modem which may be inbuilt on an RF front end chip within those devices 20, 22, 26 and which also carries the TX 20D/22D/26D and the RX 20E/22E/26E.

At least one of the PROGs 20C/20G in the UE 20 is assumed to include program instructions that, when executed by the associated DP 20A, enable the device to operate in accordance with the exemplary embodiments of this invention, as detailed above. The access node 22 (and the pico eNB 26) may also have software stored in its MEM 22B to implement certain aspects of these teachings as detailed above with respect to FIG. 3B. In this regard the exemplary embodiments of this invention may be implemented at least in part by computer software stored on the MEM 20B, 22B which is executable by the DP 20A of the UE 20 and/or by the DP 22A/26A of the access node(s) 22, 26, or by hardware, or by a combination of tangibly stored software and hardware (and tangibly stored firmware). Electronic devices implementing these aspects of the invention need not be the entire UE 20 or eNB 22 (or 26), but exemplary embodiments may be implemented by one or more components of same such as the above described tangibly stored software, hardware, firmware and DP, modem, system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and Internet appliances.

Various embodiments of the computer readable MEMs 20B, 22B and 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A and 26A include but are not limited to general purpose computers, special purpose computers, microprocessors, digital signal processors (DSPs) and multi-core processors.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The following abbreviations used in the above description and/or in the drawing figures are defined as follows:
3GPP third generation partnership project
eNB evolved Node B (base station of an LTE system)
E-UTRAN evolved UTRAN (also known as LTE)
Hetnet heterogeneous network
LTE long term evolution (also known as E-UTRAN)
NCL neighbour cell list
RAT radio access technology
RF radio-frequency
RSRP reference signal received power
RSRQ reference signal received quality
UE user equipment
UTRAN universal terrestrial radio access network

What is claimed is:

1. A method for operating a wireless user equipment, comprising:
   receiving downlink signaling from a network serving cell, the downlink signaling comprising a Measurement Object information element having a network configured flag indicating measurement reports for at least one first frequency referred to by the Measurement Object information element; and
   measuring and reporting, to the network serving cell operating on a different second frequency, a first set of neighbor cells operating on any of the at least one first frequency without regard to a configured threshold signal strength s-Measure of the serving cell;
   wherein based at least in part on the flag, the measuring of the first set of neighbor cells is less frequent than the measuring of a second set of neighbor cells also received in downlink signaling, and wherein the network configured flag is a single bit for each of the at least one first frequency, and is configured without regard to cell type.

2. The method according to claim 1, in which the configured threshold signal strength s-Measure is indicated in a Measurement Configuration information element, there are at least two first frequencies for measuring the first set of neighbor cells, and the received downlink signaling comprises, for each respective first frequency, a separate Measurement Object information element comprising a flag indicating capacity-based measurement reports for the respective first frequency.

3. The method according to claim 1, in which the method further comprises:
   receiving a downlink load indicator from one of the neighbor cells operating on the at least one first frequency; and
   wherein the measuring of that one neighbor cell is conditional on the load indicator indicating that the one neighbor cell is not overloaded.

4. The method according to claim 1, in which the method is executed by a user equipment or one or more components therefor.

5. The method according to claim 1, wherein the first set of neighbor cells comprises a cell used for capacity purposes.

6. The method according to claim 1, wherein the second set of neighbor cells comprises a cell used for coverage purposes.

7. An apparatus for communicating, comprising
   at least one processor; and
   a memory storing a set of computer instructions, in which the at least one processor is arranged with the memory storing the instructions to cause the apparatus to perform:
      receiving downlink signaling from a network serving cell, the downlink signaling comprising a Measurement Object information element having a network configured flag indicating measurement reports for at least one first frequency referred to by the Measurement Object information element; and
      measuring and reporting, to the network serving cell operating on a different second frequency, a first set of neighbor cells operating on any of the at least one first frequency without regard to a configured threshold signal strength s-Measure of the serving cell;
      wherein based at least in part on the flag, the measuring of the first set of neighbor cells is less frequent than the measuring of a second set of neighbor cells also received in downlink signaling, and wherein the network configured flag is a single bit for each of the at least one first frequency, and is configured without regard to cell type.

8. The apparatus according to claim 7, in which the configured threshold signal strength s-Measure is indicated in a Measurement Configuration information element, there are at least two first frequencies for measuring the first set of neighbor cells, and the received downlink signaling comprises, for each respective first frequency, a separate Measurement Object information element comprising a flag indicating capacity-based reports for the respective first frequency.

9. The apparatus according to claim 7, in which the at least one processor is arranged with the memory storing the instructions to cause the apparatus to further perform:
receiving a downlink load indicator from one of the neighbor cells operating on the at least one first frequency;
and wherein the measuring of that one neighbor cell is conditional on the load indicator indicating that the one neighbor cell is not overloaded.

10. The apparatus according to claim 7, in which the apparatus comprises a user equipment or one or more components therefor.

11. A non-transitory computer readable memory tangibly storing a set of instructions which, when executed on a wireless user equipment, causes the user equipment to perform at least:
receiving downlink signaling from a network serving cell, the downlink signaling comprising a Measurement Object information element having a network configured flag indicating measurement reports for at least one first frequency referred to by the Measurement Object information element; and
measuring and reporting, to the network serving cell operating on a different second frequency, a first set of neighbor cells operating on any of the at least one first frequency without regard to a threshold signal strength of the serving cell;
wherein based at least in part on the flag, the measuring of the first set of neighbor cells is less frequent than the measuring of a second set of neighbor cells also received in downlink signaling, and wherein the network configured flag is a single bit for each of the at least one first frequency, and is configured without regard to cell type.

12. The non-transitory computer readable memory according to claim 11, in which the configured threshold signal strength is indicated in a Measurement Configuration information element, there are at least two first frequencies for measuring the first set of neighbor cells, and the received downlink signaling comprises, for each respective first frequency, a separate Measurement Object information element comprising a flag indicating capacity-based measurement reports for respective first frequency.

13. The non-transitory computer readable memory according to claim 11, in which the set of instructions, when executed on a communicating apparatus, causes the apparatus to further perform:
receiving a downlink load indicator from one of the neighbor cells operating on the at least one first frequency;
and wherein the measuring of that one neighbor cell is conditional on the load indicator indicating that the one neighbor cell is not overloaded.

14. A method comprising:
arranging neighbor cells into a first list for offloading traffic and a second list for maintaining coverage; and
providing downlink signaling, the downlink signaling comprising a Measurement Object information element having a network configured flag indicating measurement reports for at least one first frequency referred to by the Measurement Object information element for measuring and reporting neighbor cells in the first list, and a threshold signal strength of a serving cell upon which measuring and reporting neighbor cells in the second list is conditional;
in which:
the network configured flag indicates that for the at least one first frequency, measuring and reporting neighbor cells in the first list is to be without regard to the threshold signal strength; and
the threshold signal strength of the serving cell comprises a parameter s-Measure; and
wherein based at least in part on the flag, the measuring of the neighbor cells in the first list is less frequent than the measuring of the neighbor cells in the second list when measurements of the second list are required, and wherein the network configured flag is a single bit for each of the at least one first frequency, and is configured without regard to cell type.

15. The method according to claim 14, in which the method is executed by a network access node or one or more components therefor.

16. The method according to claim 15, wherein the network access node is an evolved Node B (eNB) in a Long Term Evolution (LTE) system.

17. The method according to claim 14, further comprising:
receiving, from at least one cell in the neighbor cells of the first list, an indication of the at least one cell's capacity to handle additional traffic.

18. The method according to claim 17, wherein the indication of the at least one cell's capacity to handle additional traffic is received across an X2 interface in a Long Term Evolution (LTE) system.

19. The method according to claim 14, further comprising:
sending, from the serving cell to at least one neighbor cell in the first list, an indication of the serving cell's capacity to handle additional traffic.

20. The method according to claim 19, wherein the indication of the serving cell's capacity to handle additional traffic is sent across an X2 interface in a Long Term Evolution (LTE) system.

* * * * *

UNITED STATES PATENT AND TRADEMARK OFFICE
CERTIFICATE OF CORRECTION

| | | |
|---|---|---|
| PATENT NO. | : 9,094,882 B2 | Page 1 of 1 |
| APPLICATION NO. | : 13/358644 | |
| DATED | : July 28, 2015 | |
| INVENTOR(S) | : Christopher Peter Callender et al. | |

It is certified that error appears in the above-identified patent and that said Letters Patent is hereby corrected as shown below:

On the title page, Item (30), the Foreign Application Priority Data Information has been omitted. Item (30) should read:

--(30)  Foreign Application Priority Data

Jan. 24, 2012   (GB)............................1201125.0--

Signed and Sealed this
Twenty-ninth Day of December, 2015

Michelle K. Lee
*Director of the United States Patent and Trademark Office*